United States Patent
Isobe

(10) Patent No.: US 7,425,819 B2
(45) Date of Patent: Sep. 16, 2008

(54) SLOPE COMPENSATION CIRCUIT

(75) Inventor: Yuji Isobe, Irvine, CA (US)

(73) Assignee: Microsemi Corporation, Irvine, CA (US)

( * ) Notice: Subject to any disclaimer, the term of this patent is extended or adjusted under 35 U.S.C. 154(b) by 249 days.

(21) Appl. No.: 11/154,488

(22) Filed: Jun. 16, 2005

(65) Prior Publication Data

US 2006/0284607 A1    Dec. 21, 2006

(51) Int. Cl.
*G05F 1/00* (2006.01)
(52) U.S. Cl. .................. 323/222; 323/285; 323/299
(58) Field of Classification Search ........... 323/222, 323/285, 299, 282, 288
See application file for complete search history.

(56) References Cited

U.S. PATENT DOCUMENTS

| | | | |
|---|---|---|---|
| 4,357,572 A | | 11/1982 | Andersen et al. |
| 4,837,495 A | * | 6/1989 | Zansky .................... 323/222 |
| 4,975,820 A | * | 12/1990 | Szepesi .................. 363/21.17 |
| 5,028,861 A | | 7/1991 | Pace et al. |
| 5,079,453 A | | 1/1992 | Tisinger et al. |
| 5,600,234 A | | 2/1997 | Hastings et al. |
| 5,723,974 A | * | 3/1998 | Gray ....................... 323/282 |
| 5,731,731 A | | 3/1998 | Wilcox et al. |
| 5,847,554 A | | 12/1998 | Wilcox et al. |
| 5,912,552 A | | 6/1999 | Tateishi |
| 5,929,620 A | | 7/1999 | Dobkin et al. |
| 5,982,160 A | | 11/1999 | Walters et al. |
| 6,087,816 A | | 7/2000 | Volk |
| 6,101,106 A | | 8/2000 | Shi |
| 6,144,194 A | | 11/2000 | Varga |
| 6,157,180 A | * | 12/2000 | Kuo ......................... 323/282 |
| 6,177,787 B1 | | 1/2001 | Hobrecht |
| 6,181,120 B1 | | 1/2001 | Hawkes et al. |
| 6,198,265 B1 | | 3/2001 | Stevenson |
| 6,222,356 B1 | * | 4/2001 | Taghizadeh-Kaschani .. 323/288 |
| 6,232,755 B1 | | 5/2001 | Zhang |
| 6,285,174 B1 | | 9/2001 | Suzuki |
| 6,366,070 B1 | * | 4/2002 | Cooke et al. ............... 323/284 |
| 6,369,665 B1 | | 4/2002 | Chee et al. |
| 6,472,856 B2 | | 10/2002 | Groom et al. |
| 6,476,589 B2 | | 11/2002 | Umminger et al. |
| 6,495,993 B2 | | 12/2002 | Eagar |
| 6,498,466 B1 | | 12/2002 | Edwards |
| 6,522,116 B1 | | 2/2003 | Jordan |
| 6,528,976 B1 | | 3/2003 | Lenk et al. |

(Continued)

OTHER PUBLICATIONS

National Semiconductor, "LM3488: High Efficiency Low-Side N-channel Controller for Switching Regulators". National Semiconductor Corporation. May 2003, pp. 1-24.

(Continued)

*Primary Examiner*—Jeffrey L. Sterrett
*Assistant Examiner*—Harry Behm
(74) *Attorney, Agent, or Firm*—Knobbe, Martens, Olson & Bear LLP

(57) ABSTRACT

A current-mode switching regulator uses a slope compensation circuit that automatically accounts for different inductor values and varying input voltages to generate a slope compensation signal. The slope compensation circuit monitors a voltage across a semiconductor switch to extract an upslope signal that tracks increasing inductor current in the current-mode switching regulator. The slope compensation signal is generated based on the upslope signal and a difference between an input voltage and an output voltage of the current-mode switching regulator.

20 Claims, 7 Drawing Sheets

U.S. PATENT DOCUMENTS

| | | |
|---|---|---|
| 6,611,131 B2 | 8/2003 | Edwards |
| 6,724,174 B1 | 4/2004 | Esteves et al. |
| 6,774,611 B2 | 8/2004 | Umminger et al. |
| 7,045,993 B1 * | 5/2006 | Tomiyoshi ............ 323/224 |
| 7,230,406 B2 * | 6/2007 | Huang et al. ............ 323/222 |
| 7,265,530 B1 * | 9/2007 | Broach et al. ............ 324/117 R |
| 2003/0038614 A1 * | 2/2003 | Walters et al. ............ 323/282 |
| 2005/0280404 A1 * | 12/2005 | LeFevre ............ 323/282 |
| 2007/0252567 A1 * | 11/2007 | Dearn et al. ............ 323/282 |

OTHER PUBLICATIONS

National Semiconductor, "LM3477: High Efficiency High-Side N-Channel Controller for Switching Regulator", National Semiconductor Corporation. Nov. 2003, pp. 1-22.

* cited by examiner

SLOPE COMPENSATION CIRCUIT

BACKGROUND OF THE INVENTION

1. Field of the Invention

The present invention relates generally to a switching regulator and more particularly to slope compensation in current-mode switching regulators.

2. Description of the Related Art

A power conversion circuit (e.g., a switching regulator) accepts a Direct Current (DC) voltage source at one level and outputs a desired DC voltage at another level. The switching regulator includes one or more semiconductor switches. The semiconductor switches alternate between connecting and disconnecting the voltage source (or input voltage) to circuits that drive the output. For example, an inductor is periodically charged and discharged in accordance with a semiconductor switch that alternately turns on and off. The output voltage level is related to the duty cycle of the switching. The switching is typically controlled by a Pulse-Width Modulation (PWM) circuit.

A switching regulator (or switched mode power supply) can be configured for voltage-mode operation or current-mode operation. In voltage-mode operation, an output voltage of the switching regulator is monitored to adjust switching duty cycle. In current-mode operation, the output voltage of the switching regulator and current through the inductor are both monitored to adjust the switching duty cycle. The transient correction performance or compensation of a current-mode switching regulator is typically superior to a voltage-mode switching regulator.

The current through the inductor follows a seesaw pattern as the inductor is alternately charged and discharged. The current-mode switching regulator typically operates with a constant peak inductor current for a steady state output load current at a given output voltage. The output voltage is determined by the switching duty cycle which is a function of the input voltage and the output voltage. The output load current is approximately equal to an average inductor current. The output voltage may undesirably oscillate when the input voltage changes because the peak inductor current and the output voltage are controlled by separate feedback loops. The current-mode switching regulator generally uses slope compensation to modify a rate at which the inductor charges to ensure that the average inductor current, and thus the output voltage, remains stable as the input voltage changes when the switching regulator operates at greater than 50% duty cycle. Without the slope compensation, the output voltage may show subharmonic distortion which results in a lower maximum output current and higher ripple current and voltage.

Some applications use a voltage ramping circuit to generate a slope compensation signal. The voltage ramping circuit typically uses a current source to charge a capacitor, and the current source is derived using a reference voltage and a resistor. The slope compensation signal is generally a function of inductor value, the input voltage and the output voltage. When the inductor value changes due to system requirements (e.g., output ripple voltage requirement) or when the input voltage changes during usage (e.g., in a portable device using batteries), external adjustments to the voltage ramping circuit may be needed to adjust the slope compensation signal.

SUMMARY OF THE INVENTION

The present invention solves these and other problems by providing a switching regulator with a slope compensation circuit that automatically accounts for different inductor values and varying input voltages in generating a slope compensation signal. In one embodiment, a current-mode switching regulator includes at least one semiconductor switch and an inductor. The semiconductor switch and the inductor can be configured for operation as a buck converter or a boost converter. In either configuration, the semiconductor switch periodically closes to conduct substantially the same current as the inductor, and the inductor current increases linearly while the semiconductor switch is closed. A slope compensation circuit monitors a voltage across the semiconductor switch (e.g., a voltage drop across source-to-drain terminals of a metal-oxide-semiconductor field-effect transistor) and extracts an upslope signal which tracks rising current in the inductor when the semiconductor switch is closed. The slope compensation circuit generates a slope compensation signal based on the upslope signal and a difference between an input voltage and an output voltage of the current-mode switching regulator. The slope compensation signal is provided to a controller that drives the semiconductor switch.

In one embodiment, the slope compensation signal has a slope magnitude that is proportional to a slope magnitude of an approximated downslope signal. For example, the slope magnitude of the slope compensation signal is about 50% (or 50%-75%) of the slope magnitude of the approximated downslope signal. A downslope signal tracks decreasing current in the inductor (or inductor discharge current) when the semiconductor switch is opened. The downslope signal is difficult to monitor directly and occurs during a different time interval than when slope compensation signal is useful (e.g., during the upslope inductor current). The slope compensation circuit generates the approximated downslope signal from the upslope signal and the difference between the input voltage and the output voltage. The approximated downslope signal has approximately the same or a proportional slope magnitude as the downslope signal when the switching regulator is operating at greater than 50% duty cycle.

The semiconductor switch, the controller and the slope compensation circuit can be realized in a common integrated circuit. In one embodiment, the current-mode switching regulator is used in low to medium power applications of less than ten watts (e.g., 1.5 watts to 4.5 watts or a few watts). The input voltage of the current-mode switching regulator can be provided by a battery that changes in voltage level during usage. In one embodiment, the slope compensation circuit is effectively inactive when the switching duty-cycle of the semiconductor switch is less than 50%. For example, the slope compensation signal is effectively null when the input voltage is greater than half of the output voltage in a boost converter for a battery-operated portable device.

In one embodiment, the slope compensation circuit includes a continuous current-mirror circuit, a sample-and-hold current-mirror circuit and a slope conversion circuit. The continuous current-mirror circuit conducts a first current signal based on current conducted by the inductor while the semiconductor switch is on. The sample-and-hold current-mirror circuit conducts a second current signal based on current conducted by the inductor at approximately the start of every switching cycle when the semiconductor switch turns on. The slope conversion circuit generates a conversion voltage based on a difference between the input voltage and the output voltage of the current-mode switching regulator. The conversion voltage is provided to the continuous current-mirror circuit and to the sample-and-hold current-mirror circuit such that the slope compensation signal is proportional to a difference between the first current signal and the second current signal.

In one embodiment, the current-mode switching regulator uses metal-oxide-semiconductor field-effect-transistors (MOSFETs). The continuous current-mirror circuit and the sample-and-hold current-mirror circuit monitor a drain-to-source voltage of the semiconductor switch. The conversion voltage from the slope conversion circuit biases select transistors in the current-mirror circuits. For example, the conversion voltage is provided to a gate terminal in each of the current-mirror circuit.

In one embodiment, the controller includes an error amplifier, a comparator and a latch to generate a driving signal for the semiconductor switch. The error amplifier is part of an output voltage feedback loop that monitors the output voltage of the current-mode switching regulator. The error amplifier provides an output based on a difference between the output voltage (or a feedback voltage proportional to the output voltage) and a reference voltage indicative of a desired output voltage. The output of the error amplifier is used to generate an error signal (e.g., an error voltage). The comparator (e.g., a Schmitt trigger comparator) compares inputs at a first input terminal and a second input terminal to generate a reset signal for the latch. The error signal is provided to the first input terminal and a current feedback signal is provided to the second input terminal. An oscillator output periodically sets the latch, and the latch outputs the driving signal for the semiconductor switch with the pulse-width of the driving signal determined by the comparator output.

In one embodiment, the slope compensation signal modifies the error signal. For example, the slope compensation signal is subtracted from an output of the error amplifier to generate the error signal. In another embodiment, the slope compensation modifies the current feedback signal. For example, the slope compensation signal is added to the current feedback signal at the second input of the comparator.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as maybe taught or suggested herein.

DETAILED DESCRIPTION OF THE PREFERRED EMBODIMENT

Figure 1:
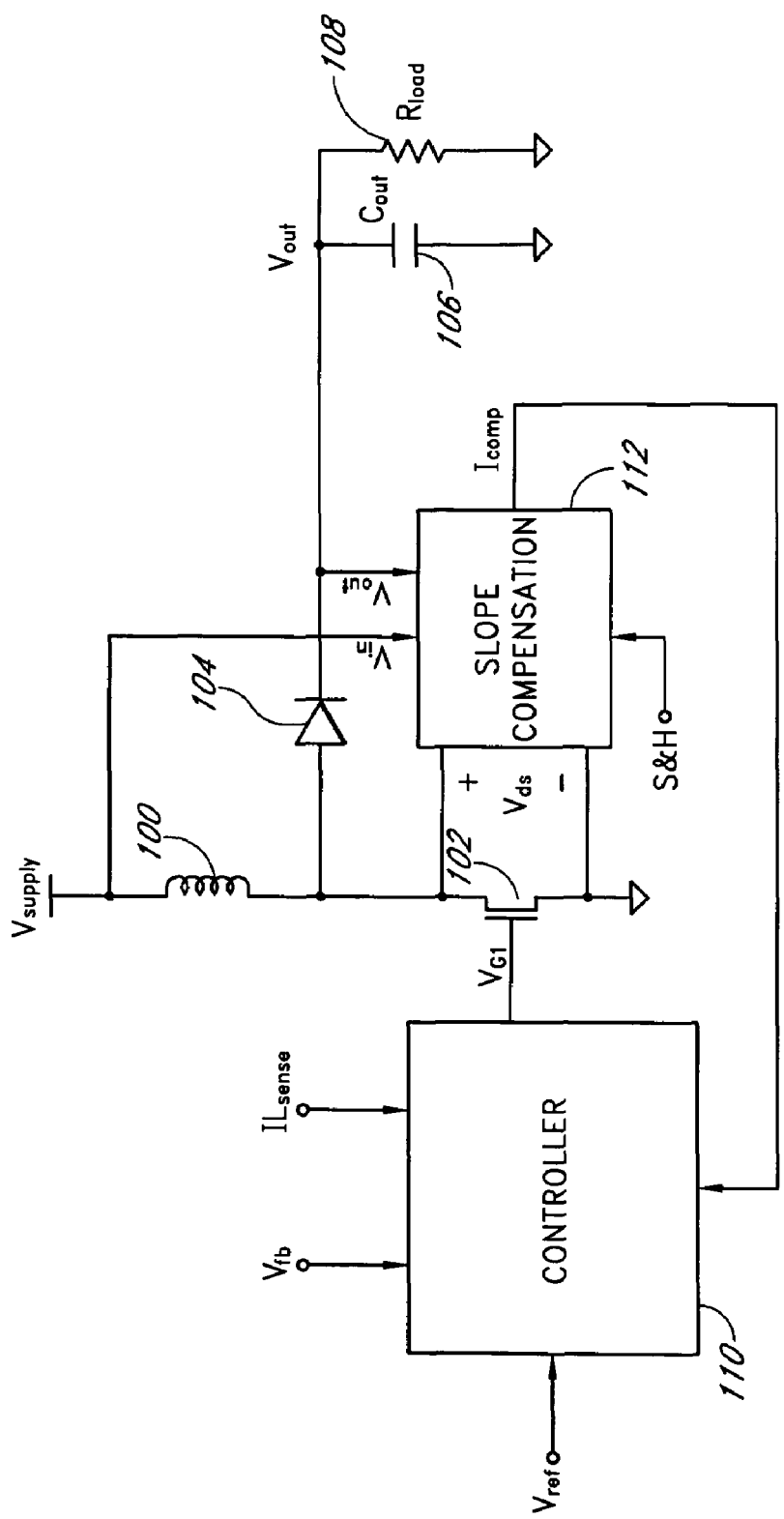
FIG. 1 is a block diagram of one embodiment of a current-mode boost converter with a slope compensation circuit coupled across a semiconductor switch.

Embodiments of the present invention will be described hereinafter with reference to the drawings. FIG. 1 is a block diagram of one embodiment of a current-mode boost converter with a slope compensation circuit 112 coupled across a semiconductor switch 102. The current-mode boost converter accepts a DC source voltage (Vsupply) of one level and produces a DC output voltage (Vout) of another, and typically higher, level. In one embodiment, the current-mode boost converter includes an input inductor 100, the semiconductor switch (or switching transistor) 102, an isolation (or rectifying) diode 104 and an output capacitor (Cout) 106. The input inductor 100 is coupled between the DC source voltage (or input voltage) and an intermediate node. The switching transistor (e.g., an N-type MOSFET) 102 is coupled between the intermediate node and ground. The isolation diode 104 has an anode coupled to the intermediate node and a cathode coupled to the output voltage. The output capacitor 106 and an output resistor (Rload) 108 are coupled in parallel between the output voltage and ground to represent a load (e.g., a microprocessor). The output capacitor 106 can also represent filter capacitance used to reduce ripple in the output voltage.

A controller 110 accepts an input control signal (Vref) indicative of a desired output voltage for the current-mode boost converter. The controller 110 controls the switching transistor 102 to achieve and to maintain the desired output voltage for the current-mode boost converter. The controller 110 monitors the output voltage via a feedback voltage (Vfb) and current flowing through the input inductor 100 via a sensed current (ILsense) to generate a variable pulse-width driving signal ($V_{G1}$) for the switching transistor 102. The variable pulse-width driving signal controls storage of electrical energy in the input inductor 100 and transfers the electrical energy to the output of the current-mode boost converter. For example, the switching transistor 102 is periodically turned on to charge (or increase current flowing through) the input inductor 100. After charging the input inductor 100 to a peak inductor current determined by the input control signal and the feedback voltage, the switching transistor 102 is turned off to allow the input inductor 100 to discharge current and provide power to the output. In other words, current conducted by the input inductor 100 continues to flow and decreases with time when the switching transistor 102 opens. The discharge current is provided to the output capacitor 106 and the output resistor 108 via the rectifying diode 104. Assuming negligible losses, the output current is approximately equal to the average inductor current.

Current-mode operation has an inherent instability when the variable pulse-width driving signal has a duty cycle that is greater than 50%. To prevent instability (or oscillations) in switching current amplitude, the slope compensation circuit 112 generates a slope compensation signal (Icomp) that is provided to the controller 110. In one embodiment, the slope compensation circuit 112 is active when the duty cycle of the switching transistor 102 is greater than 50%. In other words, the slope compensation circuit 112 is off or effectively off when the switching transistor 102 is on for less than 50% of the time. The controller 110 combines the slope compensation signal with the feedback voltage or with the sensed current during charging of the input inductor 100 (or during the upslope inductor current or when the switching transistor 102 is on) to facilitate stable operations (e.g., by maintaining a stable average inductor current when the input voltage changes). In one embodiment, the slope compensation circuit 112 and the controller 110 are fabricated on a common integrated circuit.

In one embodiment, the slope compensation circuit 112 is coupled across the switching transistor 102 and monitors a voltage (e.g., Vds) across source-to-drain terminals of the switching transistor 102 to sense current flowing through the input inductor 100. During each switching cycle, the switching transistor 102 closes to conduct substantially the same current as the input inductor 100 which starts at an initial current level and increases linearly while the switching transistor 102 is closed. In one embodiment, a sample-and-hold signal (S&H) is provided to the slope compensation circuit 112 to capture the initial current level and allows the slope compensation circuit 112 to extract an upslope signal which tracks rising current in the input inductor 100 when the switching transistor 102 is closed. An indication of the input voltage (Vin) and an indication of the output voltage (Vout) are provided to the slope compensation circuit 112. The slope compensation circuit 112 generates the slope compensation signal based on the upslope signal and a difference between the input voltage and the output voltage.

In one embodiment, the slope compensation signal has a slope magnitude that is proportional to a slope magnitude of an approximated downslope signal. For example, the slope magnitude of the slope compensation signal is about 50% (or 50%-75%) of the slope magnitude of an ideal downslope signal. The ideal downslope signal tracks decreasing current in the input inductor 100 (or inductor discharge current) when the switching transistor 102 is off. The slope compensation signal is desirably a function of the ideal downslope signal (e.g., has a slope magnitude that is ½ of the slope magnitude of the ideal downslope signal). However, the ideal downslope signal is difficult to monitor directly and occurs at a different time than when slope compensation is useful (e.g., when the input inductor is charging). The slope compensation circuit 112 generates the approximated downslope signal using the upslope signal and the difference between the input voltage and the output voltage. The approximated downslope signal has approximately the same or a proportional slope magnitude as the ideal downslope signal when the switching transistor 102 is operating at greater than 50% duty cycle.

Figure 2:
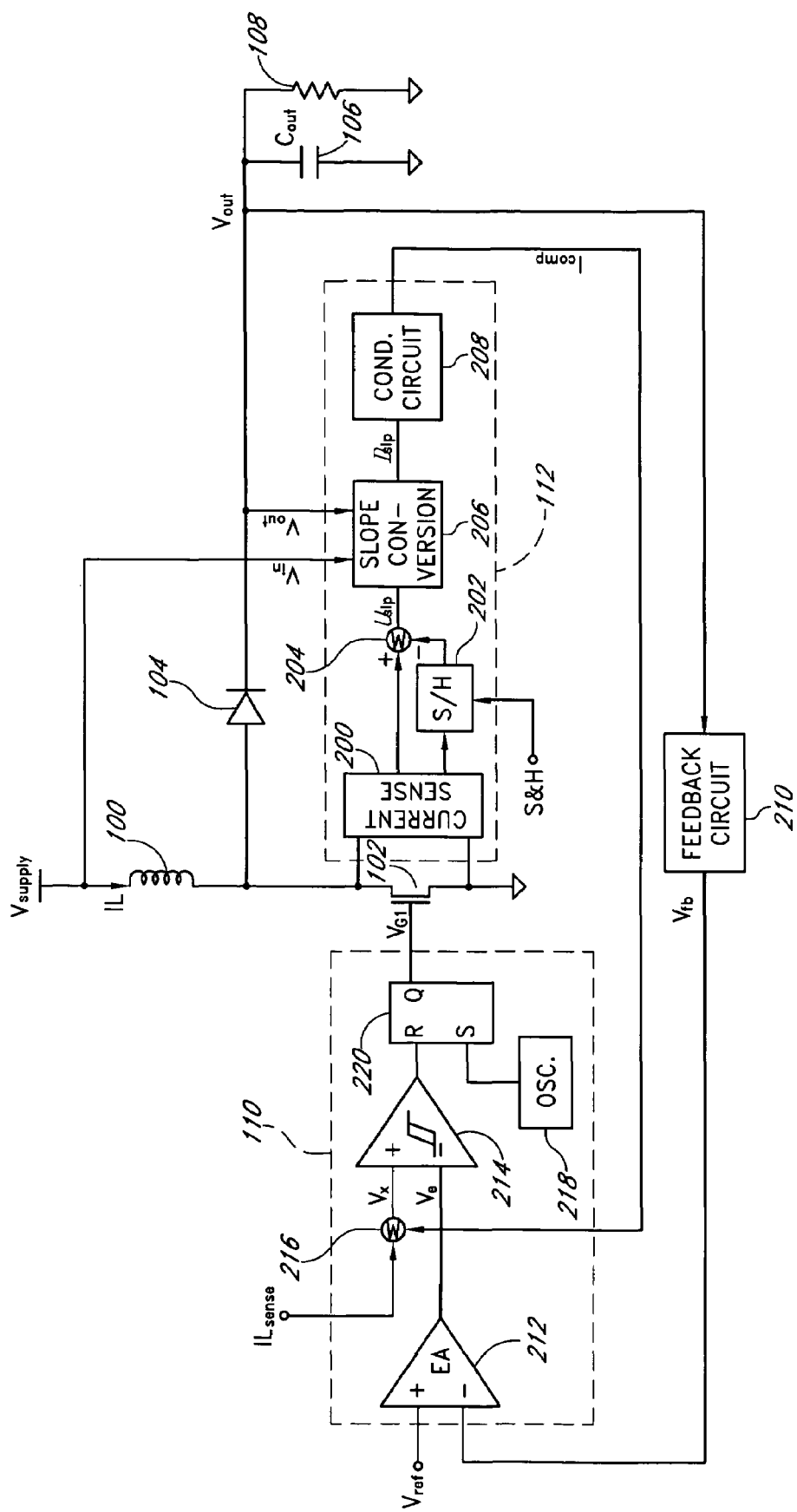
FIG. 2 is a detailed block diagram of one embodiment of the slope compensation circuit and a controller circuit shown in FIG. 1.

FIG. 2 is a detailed block diagram of one embodiment of the slope compensation circuit 112 and the controller 110 shown in FIG. 1. For example, the slope compensation circuit 112 includes a current sense circuit 200, a sample-and-hold (S/H) circuit 202, a summing circuit 204, a slope conversion circuit 206 and an optional conditioning circuit 208. The current sense circuit 200 is coupled across the source and drain terminals of the switching transistor 102 to sense the current conducted by the switching transistor 102, and thereby track the inductor current (IL), by monitoring the source-to-drain voltage when the switching transistor 102 is closed. The sample-and-hold circuit 202 is coupled to an output of the current sense circuit 200 and a sample-and-hold signal (S&H) is provided to the sample-and-hold circuit 202 to capture the current conducted by the switching transistor 102 at approximately the start of every switching cycle. The summing circuit 204 generates an upslope signal (Uslp) based on a difference between an output of the current sense circuit 200 and an output of the sample-and-hold circuit 202. The slope conversion circuit 206 receives the upslope signal, the input voltage and the output voltage to generate an approximated downslope signal (Dslp). In one embodiment, the approximated downslope signal is generated by multiplying the upslope signal with a difference between the input voltage and the output voltage and scaling the resulting product. The approximated downslope signal can be provided to the optional conditioning circuit 208 for further scaling or voltage/current conversion to generate the slope compensation signal.

A current-mode switching regulator includes two feedback loops. An outer (or voltage feedback) loop senses the output voltage and delivers a control voltage (or error signal) to an inner (or current feedback) loop. The inner loop senses inductor current and keeps the peak inductor current about constant on a pulse-by-pulse basis. In one embodiment, a feedback circuit (e.g., a voltage divider) 210 monitors the output voltage and generates a feedback voltage (Vfb) indicative of the output voltage for the controller 110. The inductor current can be monitor in a variety of ways (e.g., by monitoring voltage across the switching transistor 102, voltage across the input inductor 100, or voltage across a sense resistor inserted in series with the input inductor 100 or the switching transistor 102).

In one embodiment, the controller 110 includes an error amplifier 212, a comparator 214 and a latch 220 to generate the driving signal ($V_{G1}$) for the switching transistor 102. The error amplifier 212 is part of the voltage feedback loop that monitors the output voltage of the current-mode switching regulator. The error amplifier 212 provides an output based on a difference between the feedback voltage indicative of the output voltage and a reference voltage (Vref) indicative of a desired output voltage. The output of the error amplifier 212 is used to generate the error signal (e.g., an error voltage) for the current feedback loop. During steady-state operations, the error voltage (Ve) is approximately constant and indicative of the peak inductor current for the current feedback loop.

The comparator 214 is part of the current feedback loop. The comparator 214 compares a current feedback signal (IL-sense) indicative of the inductor current with the error voltage to generate a reset signal for the latch 220. An output from an oscillator 218 periodically sets the latch 220 and configures the switching transistor 102 to start conducting. An output of the comparator 214 resets the latch 220, and thereby turns off the switching transistor 102 until the next cycle, when the current feedback signal indicates that the peak inductor current has been reached. In one embodiment, the oscillator 218 provides the sample-and-hold signal for the slope compensation circuit 112.

In the embodiment shown in FIG. 2, the feedback voltage is provided to an inverting input of the error amplifier 212 and the reference voltage (or target voltage) is provided to a non-inverting input of the error amplifier 212. The target voltage is predefined or user-adjustable. The output of the error amplifier 212 is provided to an inverting input of the comparator 214. A summing circuit 216 combines (or adds) the slope compensation signal with the current feedback signal at the non-inverting input of the comparator 214. In other embodiments, the slope compensation signal can modify the error voltage. For example, the slope compensating signal can be subtracted from the output of the error amplifier 212 to generate the error voltage to achieve the same result.

Figure 3:
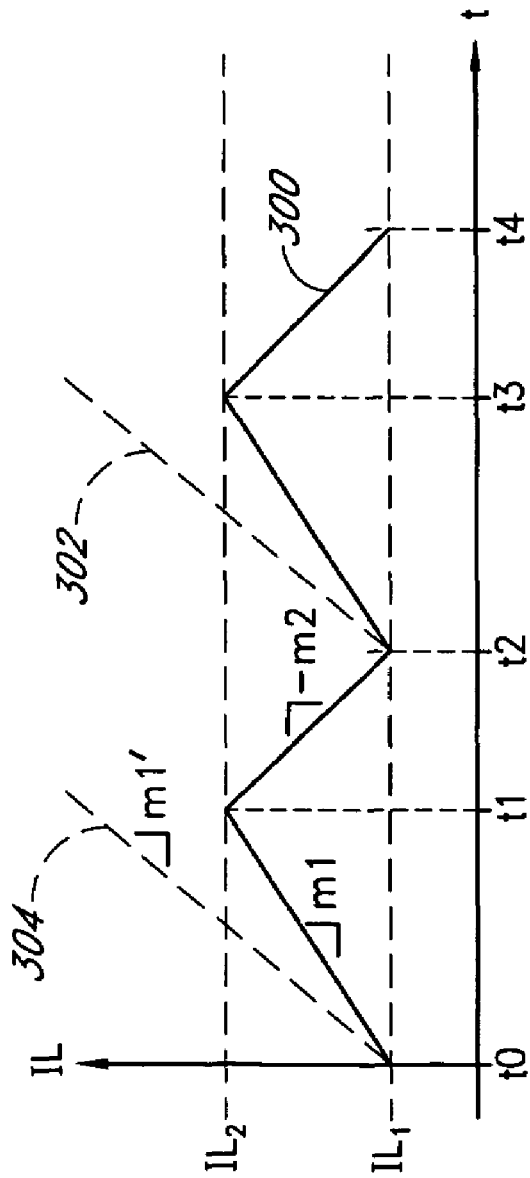
FIG. 3 illustrates current flowing through an inductor as a function of time and compensated upslopes.

FIG. 3 illustrates current flowing through the input inductor 100 as a function of time and compensated upslopes. A graph 300 illustrates the inductor current (IL) as a function of time. The inductor current follows a seesaw pattern as the input inductor 100 is periodically charged through the switching transistor 102 and discharged to the output. For example, the inductor current increases linearly from a first current level ($IL_1$) to a second current level ($IL_2$) during charging (e.g., from times t0-t1 and t2-t3) and decreases linearly from the second current level (or peak current) to the first current level (or initial current) during discharging (e.g., from times t1-t2 and t3-t4). The slope of the charging current (or upslope or m1) is approximately equal to Vin/L with the term Vin corresponding to the input voltage level and the term L corresponding to the value of the input inductor 100. The slope of the discharging current (or downslope or m2) is approximately equal to (Vout−Vin)/L with the term Vout corresponding to output voltage level.

It has been shown that slope compensation (or adjusting the upslope as perceived by the controller 110) facilitates stable operations when a current-mode switching regulator operates at greater than 50% duty cycle. The amount of slope compensation is related to the down slope (e.g., at least ½ of the downslope). Thus, the amount of slope compensation depends on the output voltage level, the input voltage level and the inductor value which may change for different applications or during operation. The slope compensation circuit 112 described above advantageously accounts for different inductor values and varying input or output voltages automatically in generating slope compensation. The slope compensation is added to the upslopes or during charging of the input inductor 100. The slope compensation circuit 112 advantageously generates slope compensation based on the upslope, when slope compensation is useful, rather than the downslope.

Graphs 302 and 304 illustrate the adjusted upslopes as perceived by the controller 110. In one embodiment, the adjusted upslopes have slopes of m1' in which m1'≈m1+(k*m2) with the term k corresponding to a constant ranging from ½ to ¾. The downslope is unaffected by slope compensation. The operating duty cycle of the current-mode switching regulator and the ranges for the inductor current may change with slope compensation to maintain the proper average inductor current for the desired output voltage.

Figure 5A:
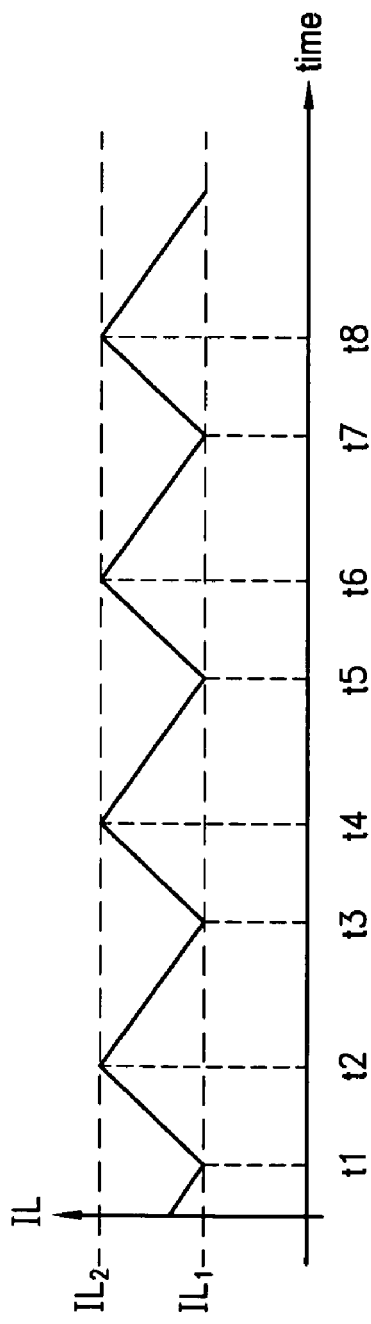
FIG. 5A illustrates current flowing through an inductor as a function of time.
Figure 5B:
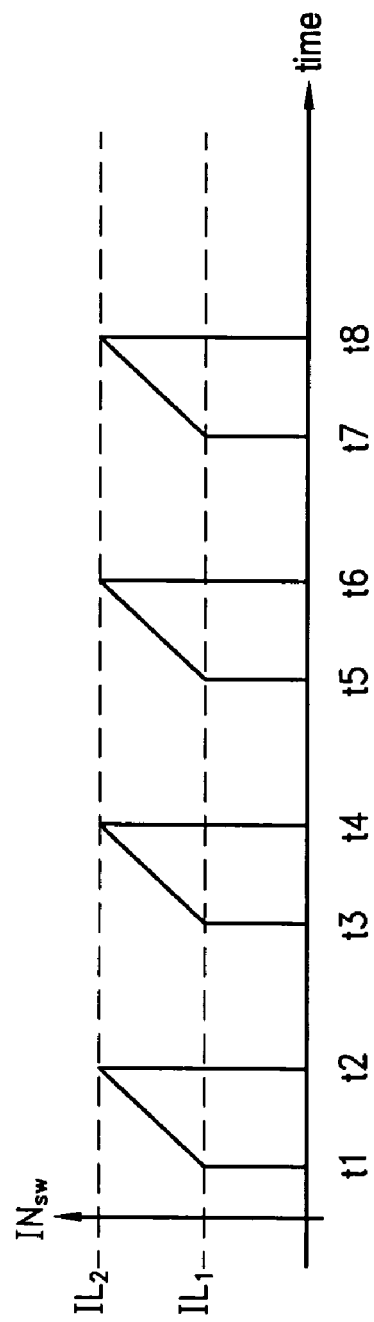
FIG. 5B illustrates current flowing through a semiconductor switch as a function of time.

Similar to FIG. 3, FIG. 5A illustrates current flowing through the input inductor 100 as a function of time. FIG. 5B illustrates corresponding current flowing through the switching transistor 102 as a function of time. For example, the inductor current (IL) linearly ramps from a first current level ($IL_1$) to a second current level ($IL_2$) during an on-duration of each periodic cycle. The on-duration corresponds to the time that the switching transistor 102 is closed (e.g., during times t1-t2, t3-t4, t5-t6, t7-t8). The inductor current linearly decreases from the second current level (or peak current level) to the first current level (or initial current) during an off-duration of each periodic cycle (e.g., during times t2-t3, t4-t5, t6-t7). The switching transistor 102 is opened during the off-durations.

The switching transistor 102 substantially conducts the same current as the inductor current when the switching transistor 102 is closed. Thus, the switch current ($IN_{sw}$) jumps to the first current level when the switching transistor 102 closes (e.g., at approximately times t1, t3, t5, t7). Similar to the inductor current, the switch current linearly ramps from the first current level to the second current level during the on-duration of each periodic cycle. During the off durations, the switch current is approximately zero.

Figure 4:
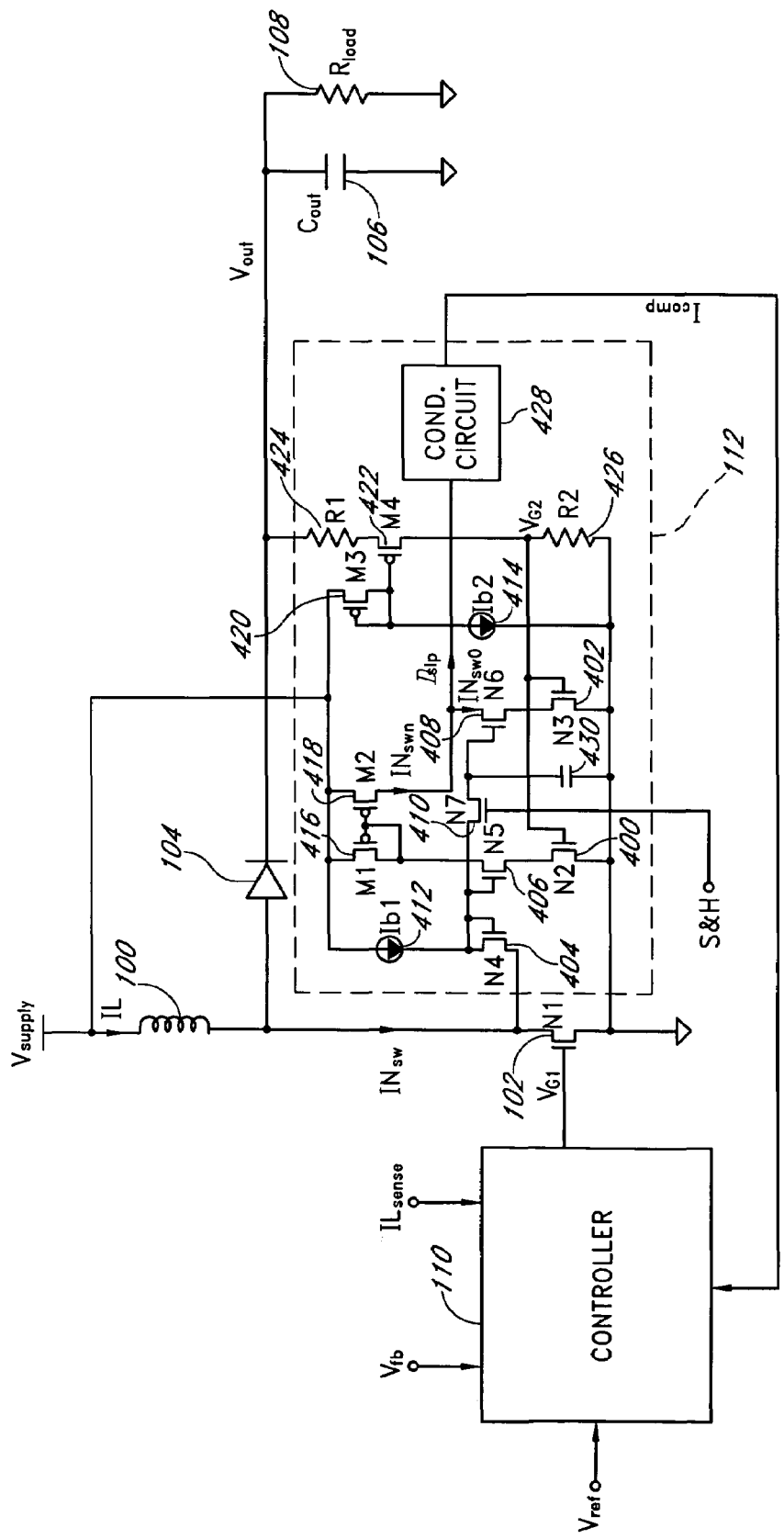
FIG. 4 is a schematic of one embodiment of a slope compensation circuit.

FIG. 4 is a schematic of one embodiment of the slope compensation circuit 112. The slope compensation circuit 112 includes a continuous current-mirror circuit, a sample-and-hold current-mirror circuit, a slope conversion circuit and an optional conditioning circuit 428. The continuous current-mirror circuit outputs a first current signal (e.g., $IN_{swn}$) that tracks current conducted by the input inductor 100 when the switching transistor 102 is closed. The sample-and-hold current-mirror circuit outputs a second current signal (e.g., $IN_{sw0}$) based on current conducted by the input inductor 100 at approximately the start of every switching cycle when the switching transistor 102 turns on. The slope conversion circuit generates a conversion voltage (e.g., $V_{G2}$) based on a difference between the input voltage and the output voltage of the current-mode switching regulator. The conversion voltage is provided to the continuous current-mirror circuit and the sample-and-hold current-mirror circuit such that a difference between the first current signal and the second current signal becomes an approximated downslope signal (Dslp). In one embodiment, the approximated downslope signal is provided to the controller 110 as the slope compensation signal. In another embodiment, the approximated downslope signal is provided to the optional conditioning circuit 428 for scaling or conversion to a voltage before being provided to the controller 110 as the slope compensation signal.

In one embodiment, the switching transistor 102 and the slope compensation circuit 112 are realized in a common integrated circuit using MOSFETs. The continuous current-mirror circuit and the sample-and-hold current-mirror circuit monitor a drain-to-source voltage of the switching transistor 102 to indirectly sense the inductor current and to generate the respective current signals. The conversion voltage from the slope conversion circuit biases select transistors in the current-mirror circuits. For example, the conversion voltage is provided to a gate terminal in each of the current-mirror circuits.

In the embodiment illustrated in FIG. 4, the continuous current-mirror circuit includes a transistor N4 404, a transistor N5 406, a transistor N2 400, a transistor M1 416, a transistor M2 418 and a first bias current source (Ib1) 412. The transistor N4 404, the transistor N5 406 and the transistor N2 are N-type MOSFETs. The transistor M1 416 and the transistor M2 418 are P-type MOSFETs. The first bias current source 412 is coupled between the input voltage (Vin) and an intermediate node. The transistor N4 404 has a source terminal coupled to a drain terminal of the switching transistor (N1) 102 while its gate terminal and drain terminal are commonly coupled to the intermediate node. The transistor N5 406 has a source terminal coupled to a drain terminal of the transistor N2 400, a gate terminal coupled to the intermediate node and a drain terminal coupled to a drain terminal of the transistor M1 416. The transistor N2 400 has a source terminal coupled to the same potential (e.g., ground) as the source terminal of the switching transistor 102 and a gate terminal coupled to the conversion voltage. The transistor M1 416 has a source terminal coupled to the input voltage and a gate terminal coupled to its source terminal. The transistor M2 418 has a source terminal coupled to the input voltage, a gate terminal coupled to the gate terminal of the transistor M1 416 and a drain terminal coupled to an output node.

The first bias current source 412 biases the transistor N4 404 and the transistor N5 406 such that the voltage at the source terminals of both transistors are approximately the same and equal to the voltage at the drain terminal of the switching transistor 102. Thus, the transistor N2 400 has the same source-to-drain voltage as the switching transistor 102 and the current conducted by the transistor N2 400 tracks (or mirrors) the current conducted by the switching transistor 102. The transistor M1 416 is coupled in series with the transistor N2 400 and conducts the same current as the transistor N2 400. The current conducted by transistor M2 418 mirrors (or tracks) the current conducted by the transistor M1 416 and is the first current signal ($IN_{swn}$) described above.

In the embodiment illustrated in FIG. 4, the sample-and-hold current-mirror circuit includes a pass transistor (N7) 410, a holding capacitor 430, a transistor N6 408 and a transistor N3 402. The pass transistor 410, the transistor N6 408 and the transistor N3 402 are N-type MOSFETs. The pass transistor 410 has a first source/drain terminal coupled to the intermediate node, a gate terminal coupled to the sample-and-hold signal, and a second source/drain terminal coupled to both a first terminal of the holding capacitor 430 and a gate terminal of the transistor N6 408. A second terminal of the holding capacitor 430 is coupled to ground. The transistor N6 408 has a drain terminal coupled to the output node and a source terminal coupled to a drain terminal of the transistor N3 402. The transistor N3 402 has a source terminal coupled to the same potential (e.g., ground) as the source terminal of the switching transistor 102 and a gate terminal coupled to the conversion voltage.

The sample-and-hold signal turns on the pass transistor 410 to allow the holding capacitor 430 to capture the voltage at the intermediate node at approximately the beginning of every switching cycle. As a result, the voltage at the source terminal of the transistor N6 408 and the drain terminal of the transistor N3 402 is approximately equal to the voltage at the drain terminal of the switching transistor 102 at approximately the time that the switching transistor 102 begins to conduct. Thus, the source-to-drain voltage of the transistor N3 402 tracks the source-to-drain voltage of the switching transistor 102 at the approximately the beginning of each switching cycle. Accordingly, the transistor N3 402 conducts a current that tracks the current (e.g., the initial current or $IL_1$) conducted by the switching transistor 102 at the beginning of each switching cycle. The transistor N6 408 is coupled in series with the transistor N3 402 and conducts the same current as the transistor N3 402 which is the second current signal ($IN_{sw0}$) described above.

In the embodiment illustrated in FIG. 4, the slope conversion circuit includes a second bias current source (Ib2) 414, a transistor M3 420, a transistor M4 422, a first resistor (R1) 424 and a second resistor (R2) 426. The transistor M3 420 and the transistor M4 422 are P-type MOSFETs. The transistor M3 420 has a source terminal coupled to the input voltage (Vin) while its gate terminal and drain terminal are commonly coupled to a first terminal of the second bias current source 414. A second terminal of the second bias current source 414 is coupled to ground. The first resistor 424 is coupled between the output voltage (Vout) and a source terminal of the transistor M4 422. The second resistor 426 is coupled between a drain terminal of the transistor M4 422 and ground. The transistor M4 422 has a gate terminal coupled to the gate terminal of the transistor M3 420.

The second bias current source 414 biases the transistor M3 420 and the transistor M4 422 to generate the conversion voltage ($V_{G2}$) across the second resistor 426 with the following relationship:

$$V_{G2} = (Vout - Vin) \times \left(\frac{R2}{R1}\right).$$

In one embodiment, the first resistor 424 and the second resistor 426 have approximately the same value and the conversion voltage is approximately the difference between the input voltage and the output voltage. The conversion voltage is provided to the gate terminals for the transistor N2 400 and the transistor N3 402.

In one embodiment, the voltage ($V_{G1}$) at the gate terminal of the switching transistor (N1) 102 is approximately the output voltage. Assuming that the transistor N4 404 and the transistor N5 406 have similar device dimensions (i.e., approximately the same Wg/Lg ratio), the current conducted by the transistor N2 400 (or the first current signal) has the following relationship:

$$IN_{swn} = IN_{sw} \times \frac{Rds1}{Rds2}.$$

$IN_{sw}$ is the current conducted by the switching transistor 102 and has the following relationship:

$$IN_{sw} = \frac{Vin}{L}t + IL_1.$$

The term L corresponds to the value of the input inductor 100, the term Vin/L corresponds to the slope (or upslope or m1) of the rising inductor current when the switching transistor 102 is closed, the term t corresponds to time, and the term $IL_1$ corresponds to the initial current at the beginning of the switching cycle. The term Rds1 corresponds to the on-resistance of the switching transistor 102, and the term Rds2 corresponds to the on-resistance of the transistor N2 400. The on-resistance of a MOSFET has the following relationship:

$$Rds = \frac{1}{k\frac{Wg}{Lg}(Vgs - Vt)}.$$

The term k corresponds to a constant, the term Wg corresponds to gate width, the term Lg corresponds to gate length, the term Vgs corresponds to the gate-to-source voltage, and the term Vt corresponds to the threshold voltage.

In the embodiment illustrated in FIG. 4, the sample-and-hold current-mirror circuit samples the current conducted by the switching transistor 102 at approximately the beginning of each switching cycle (e.g., when t is approximately zero). The transistor N3 402 and the transistor N2 400 have the same gate-to-source voltage (e.g., $V_{G2}$). The transistor N3 402 and the transistor N2 400 have approximately the same on-resistance with the assumption that they have similar device dimensions. Thus, the second current signal ($IN_{sw0}$) has the following relationship:

$$IN_{sw0} = IL_1 \times \frac{Rds1}{Rds2}.$$

Finally, with the assumption that the gate lengths for the switching transistor 102 and the transistor N2 400 are approximately the same, the approximated downslope signal (Dslp=$IN_{swn}$−$IN_{sw0}$) has the following relationship:

$$Dslp = \frac{Vin}{L}t \times \frac{W2}{W1} \frac{(Vout - Vin - Vt)}{(Vout - Vt)}.$$

The term W2 corresponds to the gate width of the transistor N2 400, and the term W1 corresponds to the gate width of the switching transistor 102.

As described above, the term Vin/L corresponds to the upslope of the inductor current. The term $$\frac{(Vout - Vin - Vt)}{(Vout - Vt)}$$

is an approximate downslope conversion factor. An ideal downslope conversion factor is approximately equal to (Vout–Vin)/Vin. Table I below provides a comparison between the ideal downslope conversion factor and the approximate downslope conversion factor multiplied by a factor of three with the assumptions that the output voltage is approximately 5 volts and the threshold voltage is approximately 0.8 volts.

TABLE I

| Vin | (Vout − Vin)/Vin | 3 × (Vout − Vin − Vt)/(Vout − Vt) |
|---|---|---|
| 5 | 0 | −0.57 |
| 4 | 0.25 | 0.14 |
| 3 | 0.67 | 0.86 |
| 2 | 1.5 | 1.57 |

As discussed above, slope compensation is useful when the operating duty cycle is greater than 50%. In a boost converter configured for an output voltage of 5 volts, the operating duty cycle is greater than 50% when the input voltage is less than 2.5 volts (or half of the output voltage). Table I shows that the approximate downslope conversion factor is comparable to the ideal downslope conversion factor in that range of input voltages (e.g., between 2-3 volts). Slope compensation is not needed when the input voltage is in the range of 4-5 volts and the slope compensation circuit 112 is off (or effectively off) for that range of input voltages in one embodiment.

Figure 6:
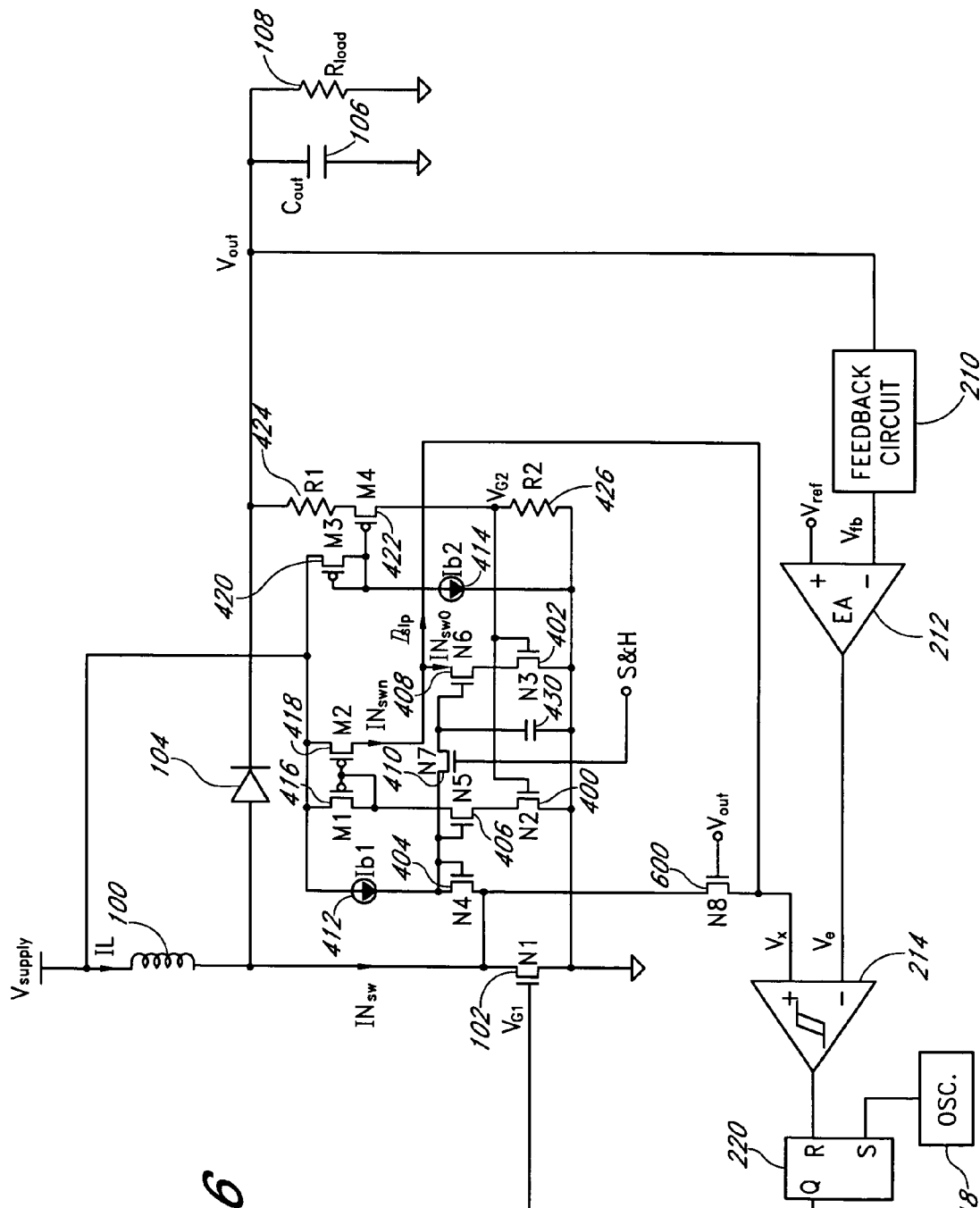
FIG. 6 is a schematic of one embodiment of a slope compensation circuit in combination with a controller circuit.

FIG. 6 illustrates one embodiment for combining the approximated downslope signal with current feedback in the controller circuit 110 to achieve slope compensation. For example, a resistor element (N8) 600 is used to combine a current feedback signal corresponding to the rising inductor current and the approximated downslope signal. The resistor element 600 is an N-type MOSFET with a drain terminal coupled to the drain terminal of the switching transistor 102, a gate terminal coupled to the output voltage and a source terminal coupled to a non-inverting input of the comparator 214. The approximated downslope signal is provided to the source terminal of the resistor element 600. The desired amount of slope compensation is achieved by adjusting the device ratios of the resistor element 600, the transistor N2 400 and the transistor N3 402 with respect to the switching transistor 102.

Figure 7:
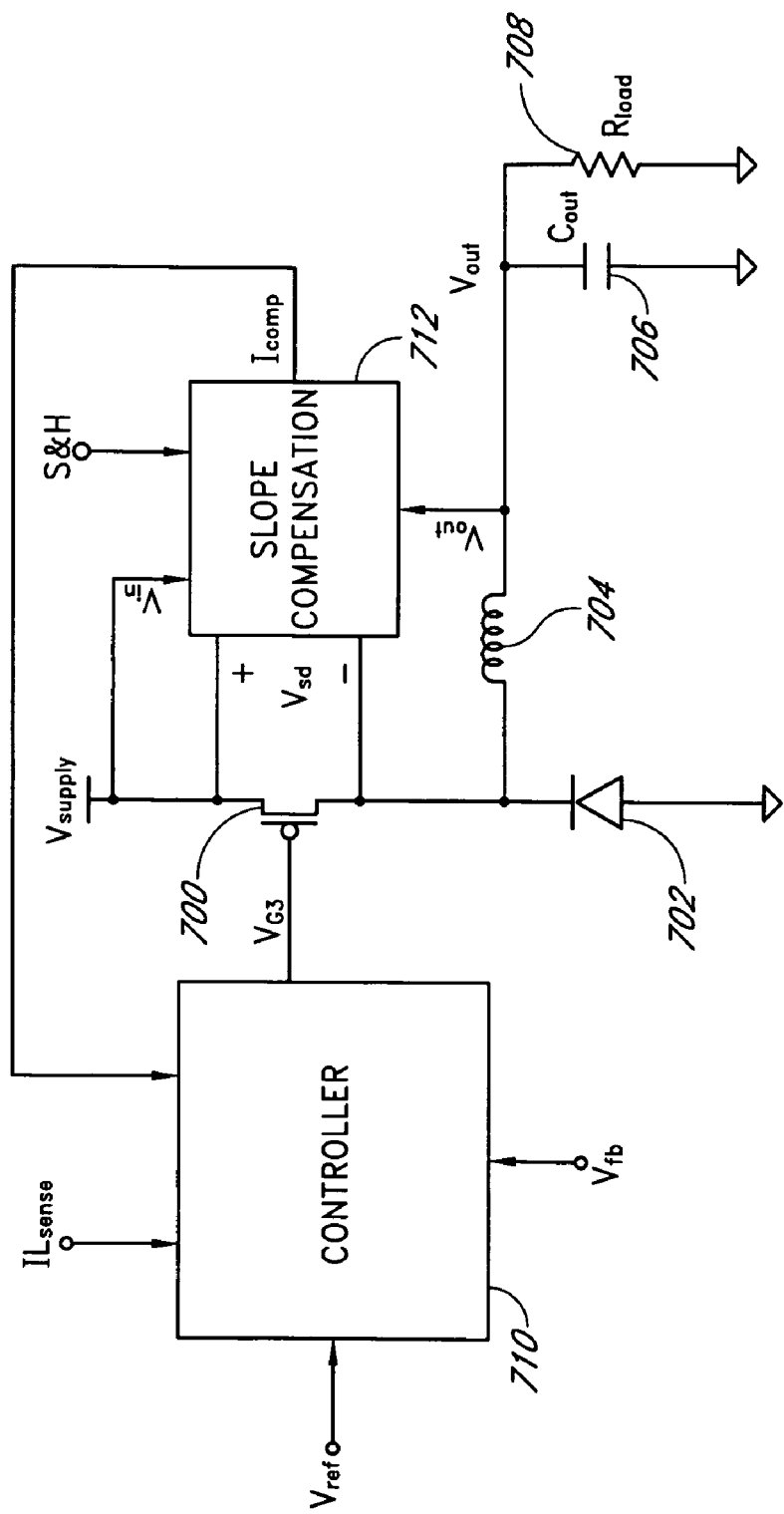
FIG. 7 is a block diagram of one embodiment of a current-mode buck converter with a slope compensation circuit coupled across a semiconductor switch.

The above embodiments illustrate a slope compensation technique for a current-mode boost converter. The slope compensation technique can also be extended to a current-mode buck converter. For example, FIG. 7 is a block diagram of one embodiment of a current-mode buck converter with a slope compensation circuit 712 coupled across a first semiconductor switch 700. The current-mode buck converter accepts a DC source voltage (Vsupply) of one level and produces a DC output voltage (Vout) of another, and typically lower, level. The DC source voltage (or input voltage) may be provided by a battery. The first semiconductor switch (or high-side switch) 700 is coupled between the input voltage and a first terminal of an inductor 704. A second terminal of the inductor 704 is coupled to the DC output voltage. An output capacitor (Cout) 706 and an output resistor (Rload) 708 are coupled in parallel to the output voltage to represent a load. The output capacitor 706 can also represent filter capacitance used to reduce ripple in the output voltage. A diode (e.g., a clamp or free-wheeling diode) 702 is coupled between the first terminal of the inductor 704 and a reference terminal (e.g., ground). The diode 702 can alternately be replaced by a second semiconductor switch (or synchronous semiconductor switch).

In the embodiment shown in FIG. 7, the high-side switch 700 is a P-type MOSFET with a source terminal coupled to the input voltage and a drain terminal coupled to the inductor 704. The high-side switch 700 can alternately be an N-type MOSFET or other types of semiconductor switches (e.g., bipolar junction transistors). If present, the second semiconductor switch (or synchronous switch) is typically an N-type transistor.

A controller 710 provides a variable pulse-width driving signal ($V_{G3}$) to control the switching of the high-side switch 700. The first terminal of the inductor 704 is alternately coupled to the input voltage when the high-side switch 700 is closed and coupled to ground through the diode 702 when the high-side switch 700 is opened. The current flowing through the inductor 704 increases when the high-side switch 700 is closed and decreases when the high-side switch 700 is opened. The DC (or average) current through the inductor 704, and consequently the output voltage, is proportional to the switching duty cycle of the high-side switch 700. For example, the DC transfer function (or output voltage) for the current-mode buck converter is substantially equal to the product of the input voltage and the switching duty cycle.

In current-mode operation, the controller 710 monitors the inductor current on a cycle-by-cycle basis in addition to the output voltage in order to adjust the duty cycle of the driving signal controlling the high-side switch 700. The controller 710 first compares a feedback voltage (Vfb) indicative of the output voltage with a reference voltage (Vref) indicative of a desired output voltage. The result of this first comparison is then compared with a signal (ILsense) indicative of the inductor current. As discussed above, current-mode operation has an inherent instability when the driving signal has a duty cycle that is greater than 50% and a slope compensation signal is introduced in the second comparison step to prevent undesirable oscillations in the output voltage.

The inductor current and the current conducted by the high-side switch 700 are approximately equal when the high-side switch 700 is closed. In one embodiment, the slope compensation circuit 712 is coupled across the high-side switch 700 to monitor the inductor current when the high-side switch 700 is closed and uses a sample-and-hold signal (S&H) to extract an upslope signal that tracks rising current in the inductor 704. The upslope signal for the current-mode buck converter has a slope approximately equal to (Vin–Vout)/L. The slope compensation circuit 712 monitors the input voltage and the output voltage to generate an approximated downslope signal based on the upslope signal. An ideal downslope signal has a slope approximately equal to Vout/L. Thus, the slope compensation circuit 712 monitors the input voltage and the output voltage to generate a slope conversion factor that is approximately equal to Vout/(Vin–Vout). The slope compensation signal is proportional to the approximated downslope signal.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A current-mode switching regulator comprising:
   at least one semiconductor switch and an inductor;
   a controller configured to periodically close the semiconductor switch to increase current conducted by the inductor; and
   a slope compensation circuit configured to generate a slope compensation signal based on an upslope signal and a difference between an input voltage and an output voltage of the current-mode switching regulator, wherein the upslope signal tracks rising current in the inductor when the semiconductor switch is closed, the upslope signal is extracted by sampling an initial voltage across the semiconductor switch at approximately the start of every switching cycle when the semiconductor switch initially closes and subtracting the initial voltage from the voltage across the semiconductor switch while the semiconductor switch continues to be closed, and the slope compensation signal is provided to the controller.

2. The current-mode switching regulator of claim 1, wherein the slope compensation signal has a slope magnitude that is proportional to an approximated slope magnitude of a downslope signal that tracks decreasing current in the inductor when the semiconductor switch is opened.

3. The current-mode switching regulator of claim 1, wherein the current-mode switching regulator is a buck converter with the output voltage less than or approximately equal to the input voltage.

4. The current-mode switching regulator of claim 1, wherein the current-mode switching regulator is a boost converter with the output voltage greater than or approximately equal to the input voltage.

5. The current-mode switching regulator of claim 1, wherein the input voltage is supplied by a battery.

6. The current-mode switching regulator of claim 1, wherein the slope compensation circuit is effectively inactive when the switching duty-cycle of the semiconductor switch is less than 50%.

7. The current-mode switching regulator of claim 1, wherein the semiconductor switch, the controller and the slope compensation circuit are realized in a common integrated circuit.

8. The current-mode switching regulator of claim 1, wherein the current-mode switching regulator is used in low to medium power applications of less than ten watts.

9. The current-mode switching regulator of claim 1, wherein the controller comprises:
   an error amplifier configured to provide an output based on a difference between a voltage feedback voltage indicative of the output voltage and a reference voltage indicative of a desired output voltage, wherein the output of the error amplifier is used to generate an error signal;
   a comparator with a first input terminal and a second input terminal, wherein the error signal is provided to the first input terminal and a current feedback signal indicative of the inductor current is provided to the second input terminal; and
   a latch configured to output a driving signal to the semiconductor switch, wherein a periodic signal sets the latch and an output of the comparator resets the latch.

10. The current-mode switching regulator of claim 9, wherein the slope compensation signal is subtracted from the output of the error amplifier to generate the error signal.

11. The current-mirror switching regulator of claim 9, wherein the slope compensation signal is added to the current feedback signal at the second input terminal of the comparator.

12. A current-mode switching regulator comprising:
   at least one semiconductor switch and an inductor;
   a controller configured to periodically close the semiconductor switch to increase current conducted by the inductor; and
   a slope compensation circuit configured to generate a slope compensation signal based on an upslope signal and a difference between an input voltage and an output voltage of the current-mode switching regulator, wherein the upslope signal tracks rising current in the inductor when the semiconductor switch is closed, the upslope signal is extracted by monitoring a voltage across the semiconductor switch, the slope compensation signal is provided to the controller, and the slope compensation circuit further comprises:
   a continuous current-mirror circuit configured to output a first current signal that tracks current conducted by the inductor while the semiconductor switch is closed;
   a sample-and-hold current-mirror circuit configured to output a second current signal based on current conducted by the inductor at approximately the start of every switching cycle when the semiconductor switch closes; and
   a slope conversion circuit configured to generate a conversion voltage based on the difference between the input voltage and the output voltage of the current-mode switching regulator, wherein the conversion voltage is provided to the continuous current-mirror circuit and the sample-and-hold current-mirror circuit such that the slope compensation signal is proportional to a difference between the first current signal and the second current signal.

13. The current-mode switching regulator of claim 12, wherein the current-mode switching regulator uses metal-oxide-semiconductor devices, the continuous current-mirror circuit and the sample-and-hold current-mirror circuit monitor a drain-to-source voltage of the semiconductor switch, and the conversion voltage is provide to a gate terminal in each of the current-mirror circuits.

14. A method of generating a slope compensation signal for a current-mode switching regulator, the method comprising:
   monitoring a voltage across a semiconductor switch, wherein the semiconductor switch periodically conducts to increase current flowing through an inductor;
   extracting an upslope signal based on the voltage drop across the semiconductor switch by sampling an initial voltage across the semiconductor switch at approximately the start of every switching cycle when the semiconductor switch initially closes and subtracting the initial voltage from the voltage across the semiconductor switch while the semiconductor switch remains closed, wherein the upslope signal tracks increasing current in the inductor when the semiconductor switch is closed; and
   generating the slope compensation signal based on the upslope signal and a difference between an input voltage and an output voltage of the current-mode switching regulator.

15. The method of claim 14, wherein the semiconductor switch is a metal-oxide-semiconductor field-effect transistor and the voltage being monitored is across source to drain terminals of the semiconductor switch.

16. The method of claim 14, wherein the slope compensation signal has a slope magnitude that is in the range of about 50%-75% of a slope magnitude for a downslope signal corresponding to an inductor discharge current when the semiconductor switch is opened.

17. The method of claim 14, wherein the current-mode switching regulator is used in a battery-operated portable device, the output voltage is greater than or approximately equal to the input voltage, and the slope compensation signal is null when the input voltage is greater than half of the output voltage.

18. The method of claim 14, wherein the current-mode switching regulator provides power in a range of approximately 1.5 to 4.5 watts.

19. A current-mode switching regulator comprising:
   means for extracting an upslope signal by periodically sampling an initial voltage across a semiconductor switch and subtracting the initial voltage from a subsequent voltage across the semiconductor switch, wherein the semiconductor switch periodically closes to conduct an inductor current and the upslope signal tracks increases in the inductor current when the semiconductor switch is closed;
   means for generating a conversion voltage proportional to a difference between an input voltage and an output voltage of the current-mode switching regulator; and
   means for generating a slope compensation signal based on the upslope signal and the conversion voltage, wherein the slope compensation signal is provided to a controller for the semiconductor switch.

20. The current-mode switching regulator of claim 19, wherein current-mirror circuits are used for extracting the upslope signal and the conversion voltage biases select transistors in the current-mirror circuits.

* * * * *